W. J. STAHR.
RAILWAY BRAKE MECHANISM.
APPLICATION FILED APR. 25, 1917.

1,246,672.

Patented Nov. 13, 1917.
2 SHEETS—SHEET 1.

Witness
R. A. Thomas

Inventor.
W. J. Stahr
By Franklin V. Hough
Attorney

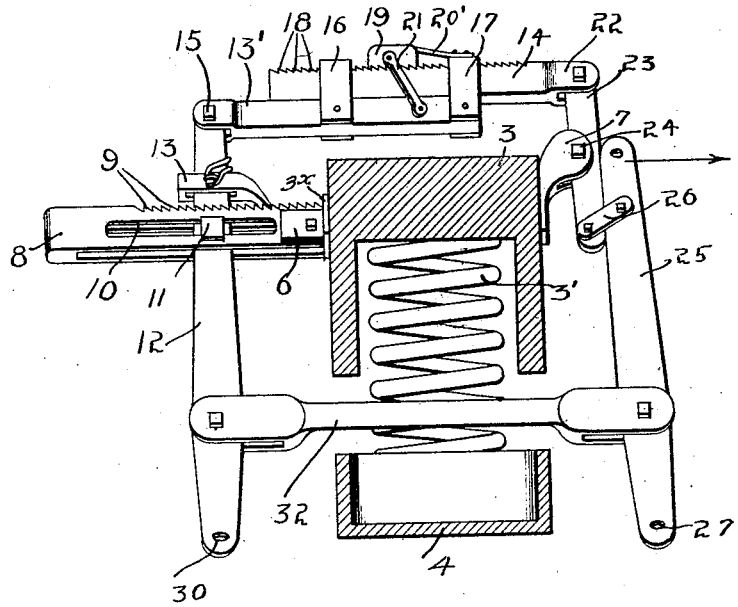

UNITED STATES PATENT OFFICE.

WILLIAM J. STAHR, OF NESCOPECK, PENNSYLVANIA.

RAILWAY-BRAKE MECHANISM.

1,246,672.

Specification of Letters Patent. Patented Nov. 13, 1917.

Application filed April 25, 1917. Serial No. 164,530.

*To all whom it may concern:*

Be it known that I, WILLIAM J. STAHR, a citizen of the United States, residing at Nescopeck, in the county of Luzerne, and State of Pennsylvania, have invented certain new and useful Improvements in Railway-Brake Mechanism; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements to railway rolling stock and particularly to the brake mechanism thereof.

The object of the present invention is the provision of means for automatically compensating for wear on the brake shoes of brakes by shortening the leverage of the brake operating levers.

The invention comprises various details of construction, combinations and arrangements of parts which will be hereinafter fully described, shown in the accompanying drawings and then specifically defined in the appended claims.

I illustrate my invention in the accompanying drawings, in which:—

Fig. 2 is a sectional view through the truck bolster with the present invention applied thereto.

Fig. 6 is a side elevational view of one of the connecting rack bars.

Figure 1:
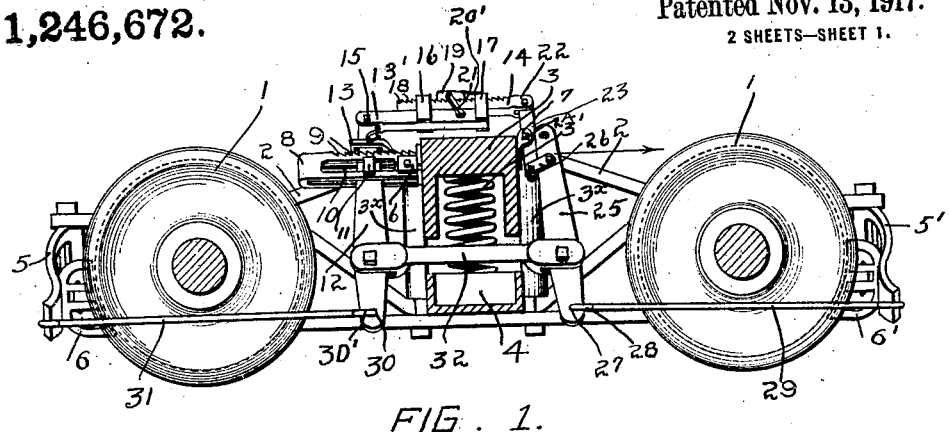
Figure 1 is a longitudinal sectional view through a truck with my invention applied thereto.
Figure 3:
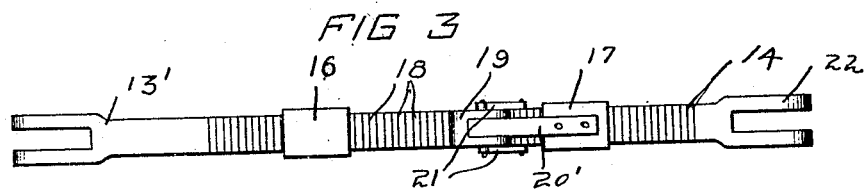
Fig. 3 is a plan view of the connecting rack bars.
Figure 4:
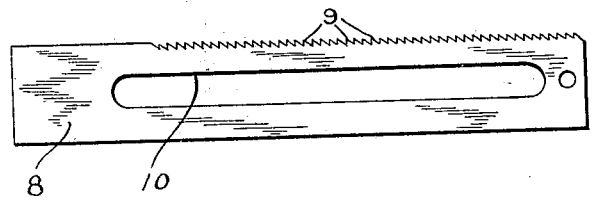
Fig. 4 is a side elevational view of a rack bar.
Figure 5:
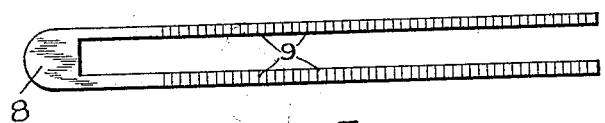
Fig. 5 is a plan view of the same.

Reference now being had to the details of the drawings by numeral, 1 indicates the wheels of a truck which comprises the side members 2 held in spaced relation by the bolster 3, mounted in the usual manner on springs 3' which in turn are seated in the spring plank 4.

Guides 3ˣ serve to guide the bolster and which are used in place of the customary transoms which ordinarily guide and retain the bolster in place.

Pivotally supported adjacent the respective ends of the side members 2 are the brake shoe supporting members 5 and 5' on which the brake shoes 6 and 6' are mounted and moved into engagement with the respective wheels by movement of the members 5 and 5'.

Secured to opposite sides of the bolster 3 are apertured lugs 6 and 7, the lugs 6 pivotally supporting the rack bar 8, which is provided with ratchet teeth 9 and an elongated slot 10, which slot 10 coöperates with the lugs 11 formed on the vertical lever 12 and guides the same in its horizontal movements. A spring-pressed pawl 13 is carried by the lever 12 and coacts with teeth 9 of the bar 8 for holding the lever in its positions of adjustment.

The separable rack bar, comprising arms 13' and 14, has the forked end of the arm 13' thereof pivotally connected to the upper end of the lever 12, as at 15, the yokes 16 and 17 extending upwardly therefrom and forming guides for the arm 14, which is provided with teeth 18 on its upper surface, coöperating with the dog 19, connected to the arm 13', by means of pivotal links 21, the dog 19 being also spring-pressed by spring 20' to normally engage the teeth 18.

This arm 14 has its bifurcated end 22 pivotally connected to the arm 23 which is centrally pivoted as at 24 between the lugs 7, the lower end of arm 23 having connection with the vertical lever 25 through links 26, the lower end of said lever 25 having an opening 27 through which the central portion 28 of rod 29 passes, each end of which rod 29 extends through an opening of a brake shoe supporting member 5'. It will be seen that movement of the lever 25 causes a relative movement of the brake shoe 6' carried by the supporting member 5'.

The lower end of the lever 12 is provided with an opening 30 to receive the central portion 30' of the rod 31, the ends of the rod being connected to the brake shoe supporting members 5 to transmit movement to the shoes 6 thereon.

A rod 32 extends under the bolster 3 and connects the levers 12 and 25 to hold the same in spaced relation with each other and, at the same time, equalize to a degree the movement of the upper ends of the levers 12 and 25 it being understood that the connecting rod transmits the stress from the lever 25 to the lever 12 and that the latter and its rods 31 and shoes 6 are actuated through the rod 32.

In the operation of the device, when the brakes are to be applied, the upper end of lever 25 is moved in the direction of the arrow, due to its connection with the air brake apparatus with the result that the arm 14 moves arm 13, through dog 19 and links and it follows that the upper end of lever 12 moves in a direction opposite to the direction indicated by the arrow, the lower end of the lever 12 communicating motion to rods 31 and applying the brakes.

It is, of course, obvious that during this movement, the pawl 13 moves along the rack bar 8 and, due to its engagement with teeth 9, prevents movement of lever 12 with relation to rack bar 8 on its return movement. If, after the brakes have been applied, the same have been worn, the arm 14 is moved in the direction of the arrow, that is on the movement of lever 25 to its normal position, with the result that the wear on the brake shoes is taken up through the levers 12 and 25 and the leverage shortened.

What I claim to be new is:—

1. In combination with a car truck and the brake shoe supports thereof, a central bolster forming a part of the truck, vertical levers supported on opposite sides of the bolster, a separable rack bar comprising arms movable with relation to each other, means for restricting movement of one arm with relation to the other arm when the levers are moved in one direction, means for restricting movement of the levers in the opposite direction, and means for communicating movement of the levers to the brake shoe supports.

2. In combination with a car truck and the brake shoe supports thereof, a central bolster forming a part of the truck, a pivoted lever supported on each side of the bolster, a separable rack bar connecting the upper ends of the levers, said rack bar comprising slidable arms, one of said arms having yokes forming guides for the opposite arm, a pivoted dog carried by one of the arms and coöperating with teeth formed on the adjacent arm for adjusting the arm with relation to each other, means carried by one of the levers for holding the arms in such adjusted position, and means connecting the lower ends of the levers and brake shoe supports whereby movement of the levers produces a relative movement thereof.

3. In combination with a car truck and the brake shoe supports thereof, a central bolster forming a part of the truck, levers supported on opposite sides of the bolster, a separable rack bar connecting the levers, said separable rack bar comprising arms slidable with relation to each other, one of said arms having teeth formed on the upper surface thereof, means carried by the opposite arm and coöperating with the teeth for permitting adjustment of the arms with relation to each other, means carried by one of the levers for holding the arms in their positions of adjustment, and means providing communication between the lower ends of the levers and brake shoe supports, whereby movement of the levers produces a relative movement of the supports.

In testimony whereof I hereunto affix my signature in presence of two witnesses.

WILLIAM J. STAHR.

Witnesses:
M. C. BOND,
G. H. LUDWIG.